(12) United States Patent
Engler et al.

(10) Patent No.: US 12,521,825 B2
(45) Date of Patent: Jan. 13, 2026

(54) DEVICE FOR AUTOMATED PRODUCTION OF SCREW CONNECTIONS

(71) Applicant: Hella GmbH & Co. KGaA, Lippstadt (DE)

(72) Inventors: Ingo Engler, Soest (DE); Frank Jagow, Erwitte (DE); Ludger-Josef Grüne, Höxter (DE); Miguel Lebrato-Rastrojo, Paderborn (DE); Thomas Albert Röbbecke, Erwitte (DE)

(73) Assignee: Hella GmbH & Co. KGaA, Lipptsadt (DE)

( * ) Notice: Subject to any disclaimer, the term of this patent is extended or adjusted under 35 U.S.C. 154(b) by 0 days.

(21) Appl. No.: 18/642,220

(22) Filed: Apr. 22, 2024

(65) Prior Publication Data
US 2024/0342844 A1    Oct. 17, 2024

Related U.S. Application Data

(63) Continuation of application No. PCT/EP2021/079658, filed on Oct. 26, 2021.

(51) Int. Cl.
*B23P 19/06*    (2006.01)
*B25J 11/00*    (2006.01)
(Continued)

(52) U.S. Cl.
CPC ............ *B23P 19/06* (2013.01); *B25J 11/005* (2013.01); *B25J 15/0019* (2013.01); *B25J 19/06* (2013.01)

(58) Field of Classification Search
CPC ........... B23P 19/06; B23P 19/04; B23P 19/00; B23P 19/006; B25J 11/005; B25J 11/00; B25J 15/0019; B25J 15/00; B25J 19/06; Y10T 29/49963; Y10T 29/49947; Y10T 29/49826; Y10T 29/49; B25B 23/105; B25B 23/10; B25B 23/08; B25B 23/02; B25B 23/00
See application file for complete search history.

(56) References Cited

U.S. PATENT DOCUMENTS 11,446,827 B2 *   9/2022   Graul ..................... B25J 13/086
11,524,373 B2 *  12/2022   Robbecke ............ B25J 15/0019
(Continued)

FOREIGN PATENT DOCUMENTS

DE    102013020138 A1    6/2015
DE    102018129533 A1   12/2019
(Continued)

*Primary Examiner* — Lawrence Averick
(74) *Attorney, Agent, or Firm* — Husch Blackwell LLP

(57) ABSTRACT

A device for automated production of screw connections includes an industrial robot with an output member rotatable about an effector axis (W) relative to an end member. A screwing unit is at least indirectly connected to the output member and rotatable by the output member about the effector axis (W). A screwing tool, a protective sleeve, and a preload spring are also included. The screwing tool is: accommodated at least in sections inside the protective sleeve; torque-proof connected with the protective sleeve; and axially displaceable along the effector axis (W) relative to the protective sleeve between a screwing position and a safety position. The screwing tool is biased in the screwing position by the preload spring.

8 Claims, 1 Drawing Sheet

(51) Int. Cl.
    *B25J 15/00*     (2006.01)
    *B25J 19/06*     (2006.01)

(56) References Cited

U.S. PATENT DOCUMENTS

| | | | |
|---|---|---|---|
| 11,623,269 B2* | 4/2023 | Thiem | B25J 11/007 |
| | | | 29/525.06 |
| 11,826,902 B2* | 11/2023 | Ishizuka | B25J 15/0019 |
| 12,202,087 B2* | 1/2025 | Ammann | B25B 23/08 |
| 2020/0039088 A1* | 2/2020 | Graul | B25J 15/0019 |
| 2020/0078964 A1 | 3/2020 | Zunke et al. | |
| 2021/0213574 A1* | 7/2021 | Robbecke | B25J 19/06 |
| 2023/0294224 A1* | 9/2023 | Ammann | B25J 13/085 |
| | | | 29/407.02 |

FOREIGN PATENT DOCUMENTS

| | | |
|---|---|---|
| DE | 102019114421 B3 | 7/2020 |
| JP | 06039654 A | 2/1994 |

* cited by examiner

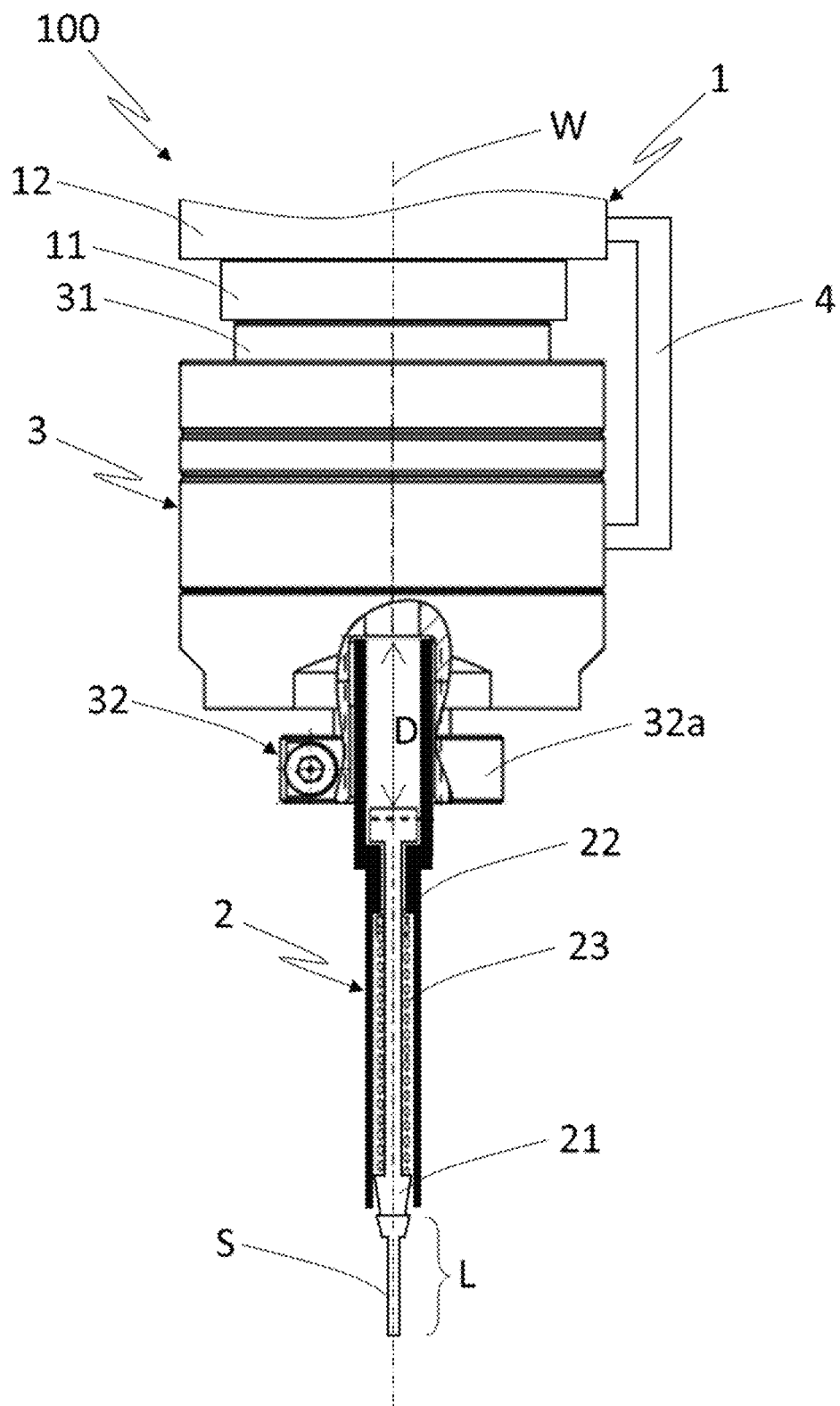

DEVICE FOR AUTOMATED PRODUCTION OF SCREW CONNECTIONS

CROSS REFERENCE

This application claims priority to PCT Application No. PCT/EP2021/079658, filed Oct. 26, 2021, the entirety which is hereby incorporated by reference.

FIELD OF THE INVENTION

The present invention relates to a device for automated production of screw connections comprising an industrial robot and a screwing unit.

BACKGROUND OF THE INVENTION

Modern workplaces for semi-automatic assembly and the associated material movement are preferably designed as so-called collaborative workplaces, where a person interacts with an industrial robot in alternating or parallel execution of work steps. In such collaborative workplaces, it must be ensured that the persons involved are not injured by colliding with the robot. This applies in particular if the robot moves screws at its end effector, which can cause serious injuries due to the typical screw geometry with a small-area tip and the forces caused by the robot.

To avoid such injuries in the event of a collision, DE 10 2018 129 533 A1, for example, discloses a device for the automated production of screw connections by means of a screw, the device having a movement system with which the screw, together with an automatic screwdriver which receives it, can be brought up to components to be connected, and the device having a protective sleeve which is arranged such that it can move with the automatic screwdriver and which protectively encloses the screw when it is arranged out of contact with one of the components to be connected. It is intended that the automatic screwdriver be movably mounted on the end member of the movement system, so that the automatic screwdriver can perform a forward movement when the screws are screwed in, during which the screws emerge from the protective sleeve at the end. Furthermore, a sensor system for collision detection is provided, for which purpose the protective sleeve is arranged on the end member of the movement system so as to be linearly movable in a longitudinal extension of the screws, and wherein an electrical sensor is integrated, with which a movement of the protective sleeve caused by an external force effect can be sensed. By means of such a sensor system, a potentially dangerous collision with a person involved can be detected and then a switching signal for stopping the entire device can be output.

BRIEF SUMMARY OF THE INVENTION

It is an object of the present invention to propose an alternative device for automated production of screw connections, which is in particular based on a simpler construction.

The technical teaching of the invention discloses a device for automated production of screw connections, comprising an industrial robot with an output member being rotatable about an effector axis relative to an end member, further comprising a screwing unit, the screwing unit being at least indirectly connected to the output member and rotatable by the output member about the effector axis and comprising a screwing tool, a protective sleeve, and a preload spring, the screwing tool being: accommodated at least in sections inside the protective sleeve; torque-proof connected with the protective sleeve; and axially displaceable along the effector axis relative to the protective sleeve between a screwing position and a safety position, wherein the screwing tool is biased in the screwing position by the preload spring.

The basic idea of the invention is to equip the device with purely constructive, i.e. passive safety elements, so that the complex sensor systems for collision detection known from the prior art and/or actuators for protection against collisions are not necessary according to the invention. For this purpose, the screwing tool is axially displaceable between a screwing position, in which the end section of the screwing tool, for example a blade tip or a screw bit, protrudes from the end of the protective sleeve, and a safety position, in which the screwing tool and, if applicable, a screw held thereon, is arranged completely within the protective sleeve. The screwing tool is continuously displaceable along the effector axis, so that the screwing position and the safety position merely designate the extreme positions of the screwing tool, wherein any intermediate position can be assumed. The screwing tool is pretensioned into the screwing position by means of the preload spring, and when a screw received on the screwing tool is screwed into an intended receptacle on a workpiece, the pretension exerted by the preload spring is sufficient to hold the screwing tool in the screwing position even during the screwdriving process. On the other hand, the spring constant of the preload spring is sufficiently low to yield in the event of a potentially injury-prone collision of the screwing tool or a screw received thereon with a person and to allow an axial displacement of the screwing tool in the direction of the safety position.

The torque transmission from the output member of the industrial robot to the screwing tool takes place by means of a torque-proof connection of the screwing tool to the protective sleeve and an at least indirect, torque-proof connection of the protective sleeve to the output member.

In an advantageous embodiment, the preload spring is designed as a spiral spring which is arranged around the screwing tool and inside the protective sleeve, which enables a space-saving and fail-safe design. For example, a circumferential web can be formed on the shaft of the screwing tool, on which one end of the preload spring is supported. Preferably, the preload spring is designed as a compression spring.

In particular, the preload spring exerts a force of 10 N to 20 N, preferably 15 N, on the screwing tool in the screwing position. Such a preload force is sufficiently high to keep the screwing tool in the screwing position during a screwdriving operation, but on the other hand not high enough to cause serious injury to a collaborating worker in the event of a collision, at least not if a non-threadforming screw is used, i.e., a screw without sharp end tip.

The torque-proof connection of the screwing tool with the protective sleeve is preferably designed as a positive connection, in particular as a spline connection or a key connection. Such types of connection allow axial displacement of the screwdriving tool relative to the protective sleeve, despite torque coupling, in order to be able to assume the different positions described.

In an advantageous embodiment, the device according to the invention comprises a planetary gear, wherein the output member of the industrial robot is connected to the drive member of the planetary gear and the output member of the planetary gear is connected to the screwing unit, in particular to the protective sleeve. By means of the interposed planetary gear, the screwdriving process can be accelerated by the planetary gear generating an increase in the rotational speed of the screwing tool compared to the rotational speed of the output member of the industrial robot. For example, a transmission ratio of 1:3 of the planetary gear may be appropriate.

In a special embodiment, the output member of the planetary gear comprises a clamping unit for connecting the protective sleeve to the output member, the clamping unit having a depth at least equal to the stroke of the screwing tool between the screwing position and the safety position. This enables a compact design of the device according to the invention, and the stroke of the screwing tool amounts to, for example, 25 mm.

In particular, the device according to the invention is dedicated for the automated production of screw connections with screws of a specific screw length, wherein the stroke of the screwing tool between the screwing position and the safety position is greater than the screw length. This is to ensure that, in the event of a collision with a screw received at the screwing tool, a sufficient stroke of the screwing tool is available to displace the entire screw into the protective sleeve.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a cross-sectional view of a device according to an example embodiment.

DETAILED DESCRIPTION OF THE DRAWINGS

Additional details, characteristics and advantages of the object of the invention are disclosed in the following description of FIG. 1, which in an exemplary fashion shows a preferred embodiment of the invention.

FIG. 1 shows a partially cut view of a device 100 according to the invention for the automated production of screw connections by means of the accommodated screw S. The device 100 comprises an industrial robot 1, in particular an articulated-arm robot, of which only the end member 12 with the output member 11 rotatable about the effector axis W is shown in FIG. 1, as well as the screwing unit 2 and the interposed planetary gear 3, which yields an indirect connection between the screwing unit 2 and the output member 11. The planetary gear 3 is held on the end member 12 by means of the bracket 4.

The drive member 31 of the planetary gear 3 is connected to the output member 11 of the industrial robot 1 and can be driven by the latter to rotate about the effector axis W. The connection between the planetary gear 3 and the screwing unit 2 is made by means of the clamping unit 32a formed on the output member 32 of the planetary gear 3, which receives and clamps the upper section of the protective sleeve 22.

The screwing tool 21 extends inside the protective sleeve 22 and is shown here in its screwing position, in which the blade with the screw S attached to it projects out of the end of the protective sleeve 22. The preload spring 23, which is designed as a coil-shaped compression spring, is arranged around the shaft of the screwing tool 21 inside the protective sleeve 22 and rests at the end against suitable contact surfaces. The screwing tool 21 is biased into the screwing position by the preload spring 23, preferably with a force of 15 N.

The torque-proof connection of the screwing tool 21 with the protective sleeve 22 is not visible in the cross-sectional view shown in FIG. 1 and is based on a positive joint, in particular by means of splined teeth or a key, so that a smooth displacement of the screwing tool 21 along the effector axis W is possible.

In the section of the clamping unit 32a, the protective sleeve 22 has a stroke space which enables the stroke D of the screwing tool 21 in the event of a collision. The upper stop corresponds to the safety position, wherein all intermediate positions can be continuously assumed by the screwing tool 21. The screw length L is preferably smaller than the stroke D, so that in the safety position of the screwing tool 21 the entire screw S is protectively accommodated within the protective sleeve 22.

The present invention is not limited by the embodiment described above, which is represented as an example only and can be modified in various ways within the scope of protection defined by the appending patent claims.

LIST OF NUMERALS 100 device
1 industrial robot
11 robot output member
12 robot end member
2 screwing unit
21 screwing tool
22 protective sleeve
23 preload spring
3 planetary gear
31 gear drive member
32 gear output member
32a clamping unit
4 bracket
D stroke
L screw length
S screw
W effector axis

We claim:

1. A device for automated production of screw connections, the device comprising:
 an industrial robot with a first output member being rotatable about an effector axis (W) relative to an end member;
 a screwing unit at least indirectly connected to the first output member and rotatable by the first output member about the effector axis (W);
 a screwing tool;
 a planetary gear including a drive member connected to the first output member of the industrial robot and a second output member connected to the screwing unit;
 a protective sleeve; and
 a preload spring,
 wherein the screwing tool is:
  accommodated at least in sections inside the protective sleeve,
  connected with the protective sleeve, and
  axially displaceable along the effector axis (W) relative to the protective sleeve between a screwing position and a safety position,
 wherein the screwing tool is biased in the screwing position by the preload spring, and wherein the second output member of the planetary gear comprises a clamping unit for connecting the protective sleeve to the second output member, the clamping unit having a depth at least equal to a stroke (D) of the screwing tool between the screwing position and the safety position.

2. The device according to claim 1, wherein the preload spring is a coil spring arranged around the screwing tool and inside the protective sleeve.

3. The device according to claim 1, wherein the preload spring is a compression spring.

4. The device according to claim 1, wherein the preload spring exerts a force of 10 N to 20 N on the screwing tool in the screwing position.

5. The device according to claim 1, wherein the connection of the screwing tool with the protective sleeve is a positive connection.

6. The device according to claim 1, wherein the device is used for automated production of screw connections with screws(S) of a specific screw length (L), wherein the stroke (D) of the screwing tool between the screwing position and the safety position is greater than a screw length (L).

7. A device for automated production of screw connections, the device comprising:
   an industrial robot with an output member being rotatable about an effector axis (W) relative to an end member;
   a screwing unit at least indirectly connected to the output member and rotatable by the output member about the effector axis (W);
   a screwing tool;
   a protective sleeve; and
   a preload spring,
   wherein the screwing tool is:
      accommodated at least in sections inside the protective sleeve,
      connected with the protective sleeve, and
      axially displaceable along the effector axis (W) relative to the protective sleeve between a screwing position and a safety position,
   wherein the screwing tool is biased in the screwing position by the preload spring, and
   wherein the connection of the screwing tool with the protective sleeve is a positive connection provided in a form of a spline connection or a key connection.

8. A device for automated production of screw connections, the device comprising:
   an industrial robot with a first output member being rotatable about an effector axis (W) relative to an end member;
   a screwing unit at least indirectly connected to the first output member and rotatable by the first output member about the effector axis (W);
   a screwing tool;
   a planetary gear including a drive member connected to the first output member of the industrial robot and a second output member connected to the screwing unit;
   a protective sleeve; and
   a preload spring,
   wherein the screwing tool is:
      accommodated at least in sections inside the protective sleeve,
      connected with the protective sleeve, and
      axially displaceable along the effector axis (W) relative to the protective sleeve between a screwing position and a safety position,
   wherein the screwing tool is biased in the screwing position by the preload spring, and
   wherein the second output member of the planetary gear is connected to the protective sleeve.

* * * * *